US012754427B2

(12) United States Patent
Gao

(10) Patent No.: US 12,754,427 B2
(45) Date of Patent: Oct. 6, 2026

(54) NEAR-EYE DISPLAY DEVICE

(71) Applicant: GUANGZHOU LUXVISIONS INNOVATION TECHNOLOGY LIMITED, Guangzhou (CN)

(72) Inventor: Zhenyu Gao, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 236 days.

(21) Appl. No.: 18/660,142

(22) Filed: May 9, 2024

(65) Prior Publication Data

US 2025/0085545 A1 Mar. 13, 2025

(30) Foreign Application Priority Data

Sep. 12, 2023 (CN) ......................... 202311176440.8

(51) Int. Cl.
*G02B 27/01* (2006.01)
*G02B 27/28* (2006.01)

(52) U.S. Cl.
CPC ....... *G02B 27/0172* (2013.01); *G02B 27/283* (2013.01); *G02B 2027/0123* (2013.01)

(58) Field of Classification Search
CPC ......................... G02B 27/0172; G02B 27/283; G02B 27/286; G02B 2027/0123
See application file for complete search history.

(56) References Cited

U.S. PATENT DOCUMENTS

| | | | | |
|---|---|---|---|---|
| 6,222,677 | B1 * | 4/2001 | Budd | G02B 27/0172 359/638 |
| 8,472,120 | B2 * | 6/2013 | Border | G02B 27/017 359/13 |
| 11,480,800 | B1 * | 10/2022 | Schuck | G02B 27/0093 |
| 2002/0167733 | A1 * | 11/2002 | Roest | G02B 27/0172 359/628 |
| 2019/0025602 | A1 * | 1/2019 | Qin | G02B 30/36 |
| 2022/0066228 | A1 * | 3/2022 | Inoguchi | G02B 27/283 |

(Continued)

FOREIGN PATENT DOCUMENTS

| | | | |
|---|---|---|---|
| CN | 107589546 A | * | 1/2018 |
| CN | 112051671 | | 12/2020 |

(Continued)

OTHER PUBLICATIONS

"Office Action of China Counterpart Application", issued on Apr. 18, 2025, p. 1-p. 7.

*Primary Examiner* — Nicholas R. Pasko
(74) *Attorney, Agent, or Firm* — JCIPRNET

(57) ABSTRACT

The disclosure discloses a near-eye display device, which includes an image source, a waveguide element, a first lens, a first quarter-wave plate, a polarizing beam splitter film, and a first linear polarizing film. The image source is configured to provide an image light beam. The waveguide element includes a first waveguide part and a second waveguide part. The polarizing beam splitter film and the first linear polarizing film are disposed between the first waveguide part and the second waveguide part. A transmission axis of the polarizing beam splitter film is parallel to a transmission axis of the first linear polarizing film, and has an included angle with a slow axis of the first quarter-wave plate. The included angle is 45 degrees.

10 Claims, 4 Drawing Sheets

(56) References Cited

U.S. PATENT DOCUMENTS

| | | | | |
|---|---|---|---|---|
| 2023/0004006 A1* | 1/2023 | Tang | .................. | G02B 27/0172 |
| 2023/0038591 A1* | 2/2023 | Dong | ................. | G02B 27/0172 |
| 2023/0108544 A1 | 4/2023 | Leu | | |

FOREIGN PATENT DOCUMENTS

| | | | | | |
|---|---|---|---|---|---|
| CN | 213069318 | U * | 4/2021 | | |
| CN | 114063286 | | 2/2022 | | |
| CN | 220773355 | | 4/2024 | | |
| WO | WO-2020119320 | A1 * | 6/2020 | ............. | G02B 27/01 |
| WO | WO-2021185033 | A1 * | 9/2021 | ........... | G02B 27/286 |

* cited by examiner

NEAR-EYE DISPLAY DEVICE

CROSS-REFERENCE TO RELATED APPLICATION

This application claims the priority benefit of China application serial no. 202311176440.8, filed on Sep. 12, 2023. The entirety of the above-mentioned patent application is hereby incorporated by reference herein and made a part of this specification.

BACKGROUND

Technical Field

This disclosure relates to a display device, and in particular to a near-eye display device.

Description of Related Art

Current mainstream solutions for augmented reality optics include Birdbath technology, free-form prism technology, diffractive waveguide technology, array waveguide technology, single free-form surface reflection technology, and Pin mirror technology. In the above technical solutions, based on the limitations of the current stage of the screen, Birdbath technology is difficult to realize a large field of view of more than 60°; free-form prism technology is more difficult to realize large field of view than Birdbath; diffractive waveguide and array waveguide technology have efficiency problems in achieving large field of view displays and the problem of excessive size of supporting projection light machines; although single free-form surface reflection technology can achieve large field of view display, the imaging quality is poor and the size and appearance have disadvantages; and pin mirror technology has the disadvantages of blocked field of view and large optical engine size.

SUMMARY

The disclosure provides a near-eye display device, capable of realizing a function of expanding a field of view on the premise of thinness and lightness of the device.

According to an embodiment of the disclosure, a near-eye display device is provided, including an image source, a waveguide element, a first lens, a first quarter-wave plate, a polarizing beam splitter film, and a first linear polarizing film. The image source is configured to provide an image light beam. The waveguide element includes a first waveguide part and a second waveguide part. The polarizing beam splitter film and the first linear polarizing film are disposed between the first waveguide part and the second waveguide part. A transmission axis of the polarizing beam splitter film is parallel to a transmission axis of the first linear polarizing film, and has an included angle with a slow axis of the first quarter-wave plate. The included angle is 45 degrees. After being reflected by a surface of the first waveguide part, the image light beam travels toward the polarizing beam splitter film. After passing through the first quarter-wave plate, at least a portion of the image light beam is reflected by a first surface of the first lens, and then passes through the first quarter-wave plate.

Based on the above, the near-eye display device provided by embodiments of the disclosure makes use of the polarization selectivity of the polarizing beam splitter film, the reflection of the image light beam by the first surface of the lens, and the influence of the quarter-wave plate on the phase of the image light beam to cause the image beam to be refracted and reflected, so that the near-eye display device may realize the function of expanding the field of view on the premise of thinness and lightness of the device by narrowing the included angle between the image light beam and the optical axis of the lens between the optical elements (the polarizing beam splitter film, the quarter-wave plate, and the lens) that have a low total number of elements.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1A:
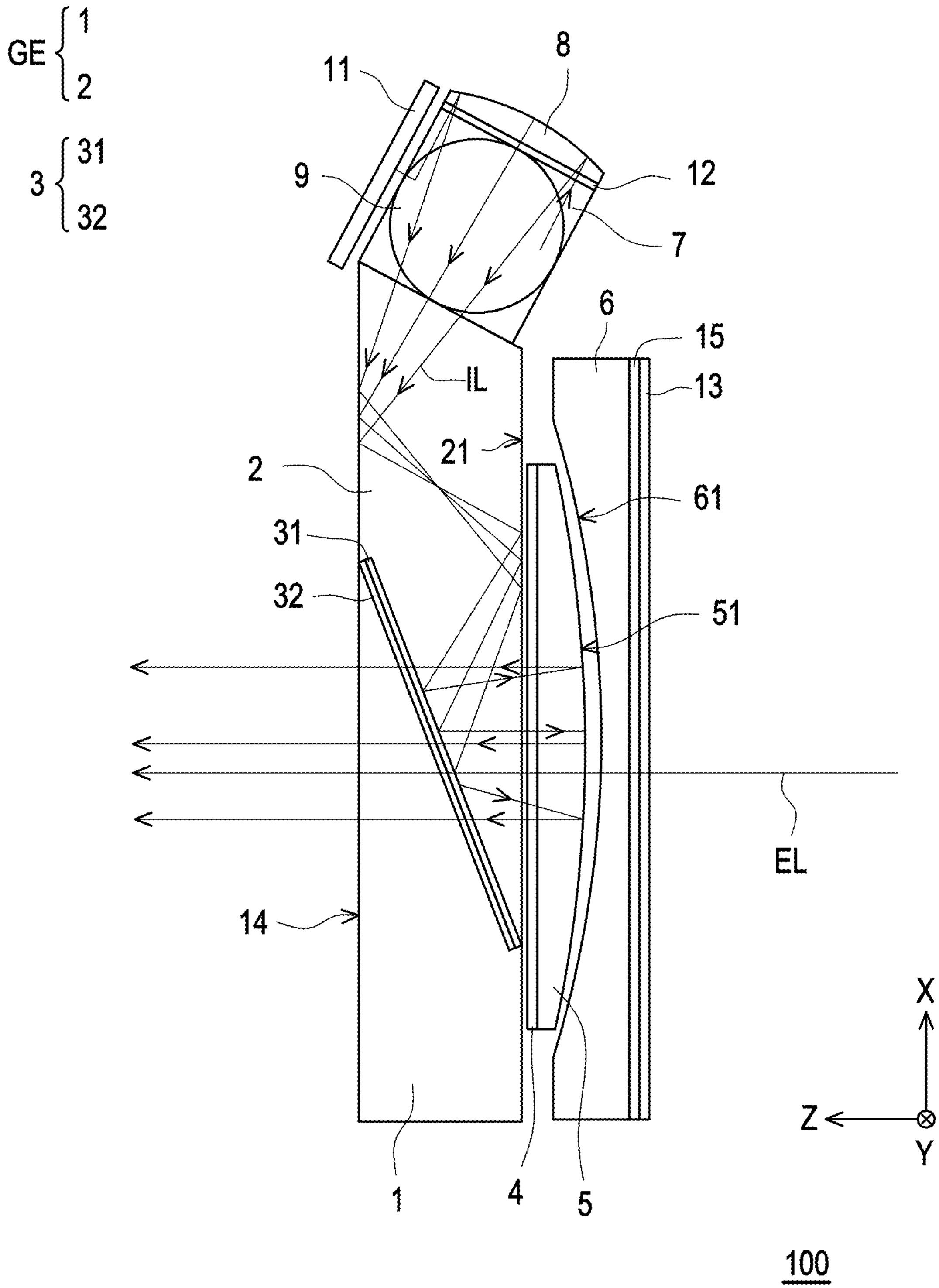
FIG. 1A to FIG. 1C show schematic diagrams of a near-eye display device according to embodiments of the disclosure.

Referring to FIG. 1A to FIG. 1D, according to an embodiment of the disclosure, a near-eye display device 100 includes an image source 11, a prism 10, a lens group 9, a polarizing beam splitter 7, a phase retarder 12, a catadioptric mirror 8, a waveguide element GE, a lens 5, a quarter-wave plate 4, and a polarization selective structure 3. The polarization selective structure 3 includes a polarization beam splitter film 31 and a linear polarization film 32, and the polarization beam splitter 7 may be specifically implemented as a polarizing beam splitter prism 7. The lens 5 may be a plano-convex lens, a biconvex lens, or a concave-convex lens. A surface 51 relatively far away from the polarization selective structure 3 is a convex surface and has a coated or adhered partially transmissive partially reflective film, such as a semi-transparent and semi-reflective film, that is not polarizable. The lens 5 may be plastic or glass. In this embodiment, the quarter-wave plate 4 is disposed on the lens 5, but the disclosure is not limited thereto. In some embodiments, the quarter-wave plate 4 and the lens 5 may be disposed separately. The catadioptric mirror 8 may include a plano-convex lens, a biconvex lens, or a concave-convex lens, and a surface of the lens relatively far away from the phase retarder 12 is convex, and is coated with a reflection enhancement film.

The image source 11 provides an image light beam IL, and may be any one of a liquid crystal display, an organic light-emitting diode display, a silicon-based liquid crystal display, a micro-light-emitting diode display, and the like, or may be implemented using laser scanning projection and digital projection technology. The image source 11 may be fixed in a system or displaceable along an optical axis. In the latter case, a virtual image distance may be modulated to adapt to users with different vision. The image light beam IL is diverted by the prism 10, is reflected on a polarizing beam splitter film surface of the polarizing beam splitter prism 7 after passing through the lens group 9, then is reflected by the catadioptric mirror 8 after passing through the phase retardation film 12, then passes through the phase retardation film 12 again, then passes through the polarizing beam splitting film surface of the polarizing beam splitting prism 7, and enters the waveguide element GE.

The waveguide element GE includes a waveguide part 1 and a waveguide part 2, in which the polarizing beam splitter film 31 and the linear polarizing film 32 are disposed between the waveguide part 1 and the waveguide part 2. A transmission axis T1 of the polarizing beam splitter film 31 is parallel to a transmission axis T2 of the linear polarizing film 32, and has an included angle with a slow axis S4 of the quarter-wave plate 4. The included angle is 45 degrees, as shown in FIG. 1D. Specifically, the included angle between the transmission axis Tl of the polarizing beam splitter film 31 and the slow axis S4 of the quarter-wave plate 4 and the included angle between the transmission axis T2 of the linear polarizing film 32 and the slow axis S4 of the quarter-wave plate 4 may be 45 degrees or −45 degrees.

The image light beam IL entering the waveguide element GE is reflected by a surface 21 of the waveguide part 2 and then travels toward the polarizing beam splitter film 31. The image light beam IL may include a portion of the image light beam IL having an electric field parallel to the transmission axis T1 of the polarizing beam splitter film 31 (and the transmission axis T2 of the linear polarizing film 32), and a portion of the image light beam IL having an electric field perpendicular to the transmission axis T1 of the polarizing beam splitter film 31 (and the transmission axis T2 of the linear polarizing film 32).

The portion of the image light beam IL having an electric field parallel to the transmission axis T1 of the polarizing beam splitting film 31 may pass through the polarizing beam splitting film 31, then continuously pass through the linear polarizing film 32 and the waveguide part 1, leave the waveguide part 1 from a light exit surface 14 of the waveguide part 1, and enter eyes of a user.

Figure 1B:
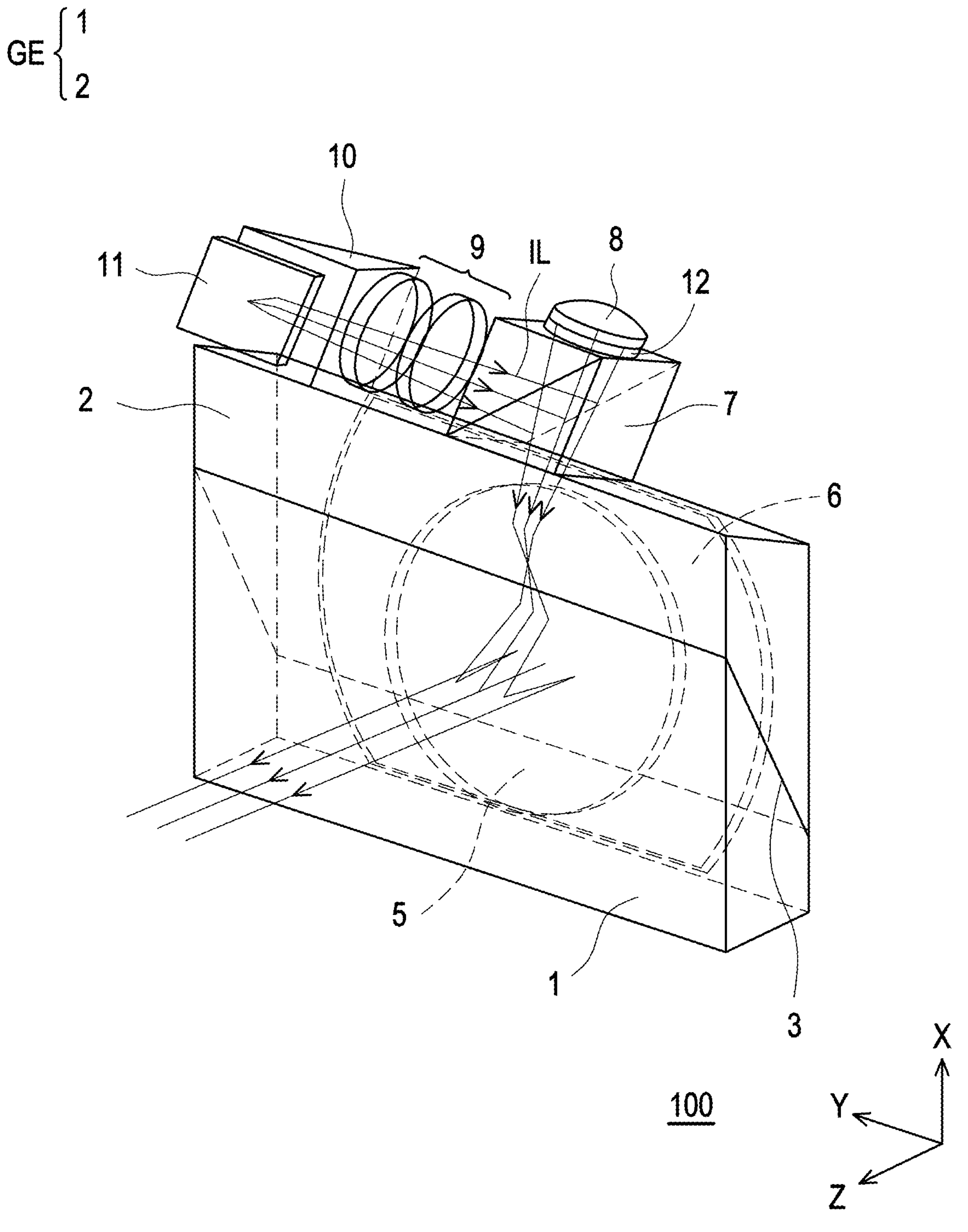
Figure 1C:
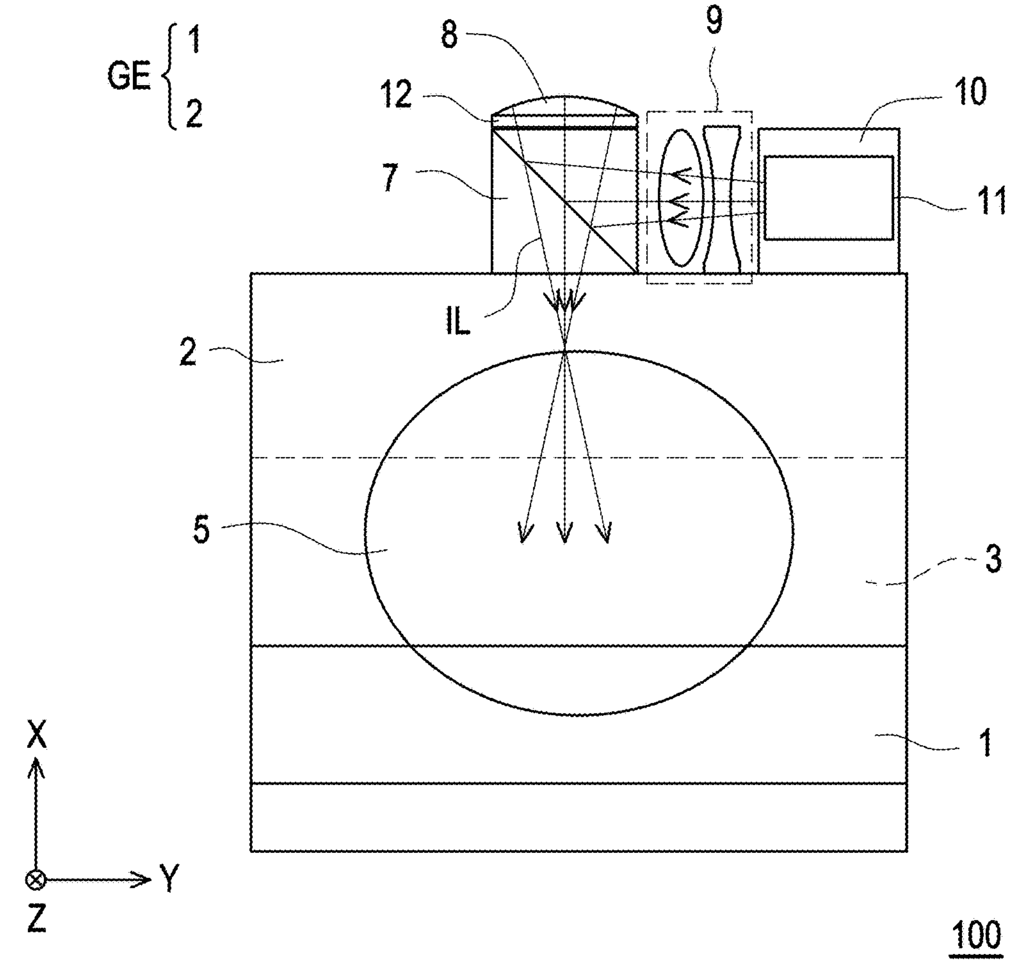
Figure 1D:
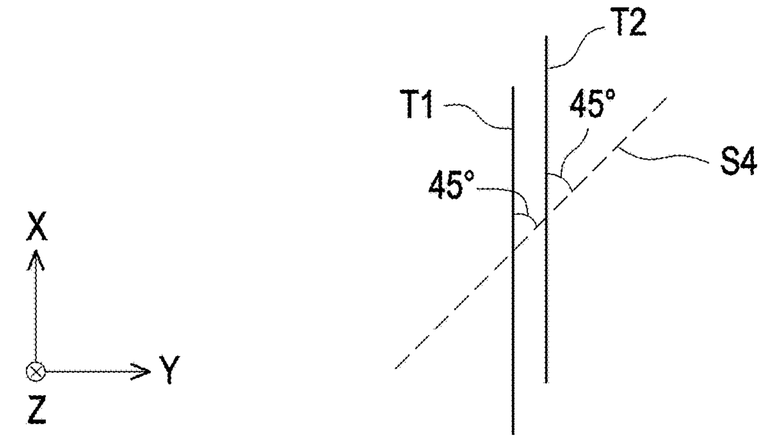
FIG. 1D shows a schematic diagram of an angular relationship between a transmission axis of a polarizing beam splitter film and a linear polarizing film and a slow axis of a quarter-wave plate according to an embodiment of the disclosure.

On the other hand, as shown in FIG. 1A to FIG. 1C, the portion of the image light beam IL having an electric field perpendicular to the transmission axis Tl of the polarizing beam splitting film 31 is reflected by the polarizing beam splitting film 31, passes through the waveguide part 2 and the quarter-wave plate 4 approximately in a negative Z (−Z) direction or in a direction substantially parallel to the negative Z direction, is reflected by the surface 51 of the lens 5, travel in a positive Z (+Z) direction or in a direction approximately parallel to the positive Z direction, and then passes through the quarter-wave plate 4 again. Specifically, through the process described above, the image light beam IL having an electric field perpendicular to the transmission axis T1 of the polarizing beam splitter film 31 passes through the quarter-wave plate 4 for the first time and is formed into a circularly polarized light (right circularly polarized light or left circularly polarized light) traveling in the negative Z direction, and then is successively reflected by the surface 51 of the lens 5 and is formed into a reversed circularly polarized light (left circularly polarized light or right circularly polarized light) traveling in the positive Z direction. After passing through the quarter-wave plate 4 again, the image light beam IL is formed into the image light beam IL having an electric field parallel to the transmission axis T1 of the polarizing beam splitter film 31, passes through the waveguide part 2, the polarizing beam splitter film 31, the linear polarizing film 32, and the waveguide part 1 sequentially, leaves the waveguide part 1 from the light exit surface 14 of the waveguide part 1, and enters the eyes of the user.

Since the image light beam IL has a certain width, in some embodiments, in order to ensure that different portions of the image light beam IL have the same or similar optical path during the traveling process and avoid image distortion, the light exit surface 14 of the waveguide part 1 and the surface 21 of the waveguide part 2 are disposed parallel to each other, that is, the waveguide element GE is a planar light-transmitting plate body with a uniform thickness, as shown in FIG. 1A. However, the disclosure is not limited thereto. In some embodiments, the light exit surface 14 of the waveguide part 1 and the surface 21 of the waveguide part 2 may be curved surfaces with the same curvature radius. That is, the waveguide element GE is a curved light-transmitting plate body with a uniform thickness.

It should be noted that, as shown in FIG. 1A, an included angle between the image light beam IL and an optical axis of the lens 5 is larger before the image light beam IL is reflected by the surface 51 of the lens 5, and the included angle between the image light beam IL and the optical axis of the lens 5 becomes smaller after the image light beam IL is reflected by the surface 51 of the lens 5. Accordingly, an image input from the image source 11 to the waveguide element GE may have a larger field of view, and through the above process, the included angle between the image light beam IL and the optical axis of the lens 5 may be reduced. That is, the near-eye display device 100 provided by the embodiment of the disclosure may realize a function of expanding the field of view.

Ambient light EL may enter the near-eye display device 100 and pass through the lens 5, the quarter-wave plate 4, the waveguide part 2, the polarizing beam splitter film 31, the linear polarizing film 32, and the waveguide part 1 sequentially. Based on this, visualized augmented reality or mixed reality technology that combines the image light beam IL and the ambient light EL is realized.

In some embodiments, the polarizing beam splitter 7 is a polarizing beam splitting prism 7, the phase retardation plate 12 is a quarter-wave plate 12, and there is an included angle between a slow axis of the quarter-wave plate 12 and a transmission axis of the polarizing beam splitting prism 7, the included angle being 45 degrees. Furthermore, the image light beam IL is configured as linearly polarized light before entering the polarizing beam splitting prism 7. By appropriately disposing the polarizing beam splitting prism 7 and the quarter-wave plate 12, the linearly polarized image light beam IL is reflected by a polarizing beam splitter film of the polarizing beam splitting prism 7, passes through the quarter-wave plate 12, is reflected by the convex surface of the catadioptric mirror 8, passes through the quarter-wave plate 12 again, and then is formed into the linearly polarized light that can pass through the polarizing beam splitter film surface of the polarizing beam splitting prism 7. In addition, after being reflected by the surface 21 of the waveguide part 2, the linearly polarized image light beam IL becomes light that travels toward the polarizing beam splitter film 31 and has a polarization direction perpendicular to the transmission axis T1 of the polarizing beam splitter film 3. With the above configuration, it is possible to image the image light beam IL emitted from the image source 11 in exactly the same manner as described above in which the image light beam IL passes through the quarter-wave plate 4, is reflected by the surface 51 of the lens 5, and passes through the quarter-wave plate 4 again. It should be particularly noted that, compared to the architecture of the prior art in which multiple optical elements are configured to realize the function of expanding the field of view, the near-eye display device 100 provided by the embodiment of the disclosure makes use of the polarization selectivity of the polarizing beam splitter film 31, the reflection of the image light beam IL by the surface 51 of the lens 5, and the influence of the quarter-wave plate 4 on the phase of the image light beam IL to cause the image beam IL to be refracted and reflected, so that the near-eye display device 100 may realize the function of expanding the field of view on the premise of thinness and lightness of the device by narrowing the included angle between the image light beam IL and the optical axis of the lens 5 between the optical elements (the polarizing beam splitter film 31, the quarter-wave plate 4, and the lens 5) that have a low total number of elements.

According to a MTF curve of the near-eye display device 100 according to the embodiment of the disclosure, when spatial frequency is 32 lp/mm, the MTF still has a performance greater than 0.7. Assuming that the MTF is 0.3 or above, the near-eye display device 100 has a resolution of 80 lp/mm.

Next, please refer to FIG. 1A. In some embodiments, the near-eye display device 100 may further include a lens 6, a linear polarizing film 13, and a quarter-wave plate 15. When entering the near-eye display device 100, the ambient light EL passes through the linear polarizing film 13, the quarter-wave plate 15, the lens 6, the lens 5, the quarter-wave plate 4, the waveguide part 2, the polarizing beam splitter film 31, the linear polarizing film 32, and the waveguide part 1 sequentially. The lens 6 has refractive power and is used to compensate for the influence of the waveguide part 1, the waveguide part, 2 and the lens 5 on the viewing of the external environment and to adjust a diopter of a see-through optical path. The lens 6 may be independent, or may be glued to the lens 5. If the lens 6 is disposed independently and is not glued to the lens 5, it can be designed through structural coordination, such as adding a magnetic structure to facilitate replacement, so as to adapt to users with different vision.

The linear polarizing film 13 and the quarter-wave plate 15 may reduce the image light beam IL from emitting from the lens 6 in the negative Z direction or in a direction approximately parallel to the negative Z direction, causing exposure of image information. Specifically, in some embodiments, a slow axis of the quarter-wave plate 15 is parallel to a slow axis of the quarter-wave plate 4, and a transmission axis of the linear polarizing film 13 is perpendicular to a transmission axis of the linear polarizing film 32. In some embodiments, the slow axis of the quarter-wave plate 15 is perpendicular to the slow axis of the quarter-4 wave plate, and the transmission axis of the linear polarizing film 13 is parallel to the transmission axis of the linear polarizing film 32, which may avoid exposure of image information.

In some embodiments, the lens 5 may not be disposed in the near-eye display device 100, and the lens 6 may have a surface with a concave surface 61 facing the quarter-wave plate 4 as shown in FIG. 1A. In this case, the image light beam IL may be reflected on the surface 61. That is, the above process of passing through the quarter-wave plate 4, being reflected by the surface 51 of the lens 5, and passing through the quarter-wave plate 4 again may be replaced by the process of passing through the quarter-wave plate 4, being reflected by the surface 61 of the lens 6, and passing through the quarter-wave plate 4 again. By reducing the use of the lens 5, the cost may be reduced and the size of the near-eye display device 100 may be reduced.

Figure 2:
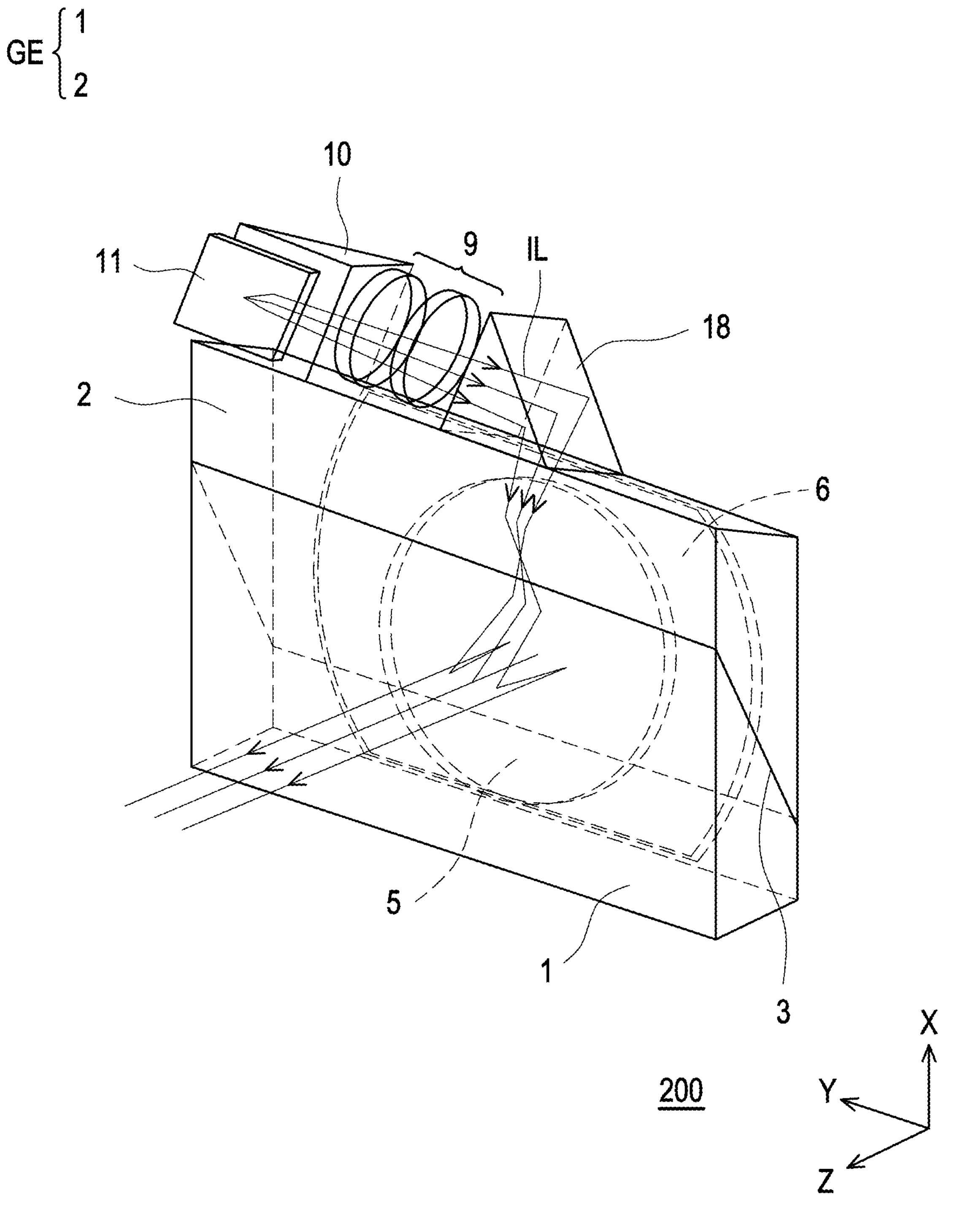
FIG. 2 shows a schematic diagram of a near-eye display device according to an embodiment of the disclosure.

Referring to FIG. 2, a near-eye display device 200 is provided according to an embodiment of the disclosure. Compared with the near-eye display device 100, in the near-eye display device 200, a single prism 18 replaces the polarizing beam splitting prism 7, the phase retarder 12, and the catadioptric mirror 8, and the image light beam IL emitted from the lens group 9 may be reflected and redirected to enter the waveguide element GE.

Based on the above, the near-eye display device provided by embodiments of the disclosure makes use of the polarization selectivity of the polarizing beam splitter film, the reflection of the image light beam by the surface of the lens, and the influence of the quarter-wave plate on the phase of the image light beam to cause the image beam to be refracted and reflected, so that the near-eye display device may realize the function of expanding the field of view on the premise of thinness and lightness of the device by narrowing the included angle between the image light beam and the optical axis of the lens between the optical elements (the polarizing beam splitter film, the quarter-wave plate, and the lens) that have a low total number of elements.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A near-eye display device, comprising an image source, a waveguide element, a first lens, a first quarter-wave plate, a polarizing beam splitter film, a first linear polarizing film, a second linear polarizing film and a second quarter-wave plate, wherein the image source is configured to provide an image light beam, the waveguide element comprises a first waveguide part and a second waveguide part, wherein the polarizing beam splitter film and the first linear polarizing film are disposed between the first waveguide part and the second waveguide part, a transmission axis of the polarizing beam splitter film is parallel to a transmission axis of the first linear polarizing film, and has an included angle with a slow axis of the first quarter-wave plate, the included angle being 45 degrees, after being reflected by a surface of the first waveguide part, the image light beam travels toward the polarizing beam splitter film, and after passing through the first quarter-wave plate, at least a portion of the image light beam is reflected by a first surface of the first lens without passing through the second linear polarizing film and the second quarter-wave plate, and then passes through the first quarter-wave plate, wherein when ambient light enters the near-eye display device, the ambient light passes through the second linear polarizing film and the second quarter-wave plate sequentially, and then passes through the first quarter-wave plate.

2. The near-eye display device according to claim 1, wherein when ambient light enters the near-eye display device, the ambient light passes through the first lens, the first quarter-wave plate, the first waveguide part, the polarizing beam splitter film, the first linear polarizing film, and the second waveguide part sequentially.

3. The near-eye display device according to claim 1, wherein the at least a portion of the image light beam is reflected and converged by the first surface of the first lens.

4. The near-eye display device according to claim 1, wherein the second waveguide part has a light exit surface, and the light exit surface is parallel to the surface of the first waveguide part.

5. The near-eye display device according to claim 1, wherein a slow axis of the second quarter-wave plate is parallel to the slow axis of the first quarter-wave plate, and a transmission axis of the second linear polarizing film is perpendicular to the transmission axis of the first linear polarizing film.

6. The near-eye display device according to claim 1, wherein a slow axis of the second quarter-wave plate is perpendicular to the slow axis of the first quarter-wave plate, and a transmission axis of the second linear polarizing film is parallel to the transmission axis of the first linear polarizing film.

7. The near-eye display device according to claim 1, further comprising a second lens, wherein when ambient light enters the near-eye display device, the ambient light passes through the second lens and then passes through the first lens, and the second lens has diopter.

8. The near-eye display device according to claim 1, wherein the first lens has a surface with a concave surface facing the first quarter-wave plate.

9. The near-eye display device according to claim 1, further comprising a polarization conversion device disposed on a path of the image light beam and located between the image source and the waveguide element, wherein the image light beam passing through the polarization conversion device is reflected by the surface of the first waveguide part, and then is formed into light traveling toward the polarizing beam splitter film and having a polarization direction perpendicular to the transmission axis of the polarizing beam splitter film.

10. The near-eye display device according to claim 9, wherein the polarization conversion device comprises a polarizing beam splitter and a third quarter-wave plate.

* * * * *